United States Patent
Schoenfish et al.

(10) Patent No.: US 6,439,530 B1
(45) Date of Patent: Aug. 27, 2002

(54) MOUNTING APPARATUS FOR AN ELECTRONIC DEVICE

(75) Inventors: Brian G. Schoenfish, Kansas City; Dale R. Langner; Jeffrey D. Minelli, both of Olathe, all of KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 09/885,421

(22) Filed: Jun. 20, 2001

(51) Int. Cl.⁷ .................................................. A47B 91/00
(52) U.S. Cl. .............................. 248/346.06; 248/346.2
(58) Field of Search ....................... 248/346.06, 346.01, 248/346.2, 104, 310, 910

(56) References Cited

U.S. PATENT DOCUMENTS

| | | | | |
|---|---|---|---|---|
| 2,219,974 A | * | 10/1940 | Bellow | 220/69 |
| 2,806,131 A | * | 9/1957 | Palmer | 240/1.2 |
| 2,916,184 A | * | 12/1959 | Hartley et al. | 220/69 |
| 2,956,287 A | * | 10/1960 | Stanford | 4/110 |
| 4,606,524 A | * | 8/1986 | Conee | 248/346 |
| 4,687,167 A | * | 8/1987 | Skalka et al. | 248/282 |
| 4,788,916 A | * | 12/1988 | Saxton | 108/43 |
| D312,650 S | * | 12/1990 | Charrier | D16/242 |
| 5,193,220 A | * | 3/1993 | Ichinohe et al. | 455/89 |
| 5,332,185 A | * | 7/1994 | Walker, III | 248/346 |
| 5,350,147 A | * | 9/1994 | Paganus | 348/346 |
| 5,735,632 A | * | 4/1998 | Braverman | 404/6 |
| 5,742,256 A | * | 4/1998 | Wakabayashi | 343/718 |
| 5,810,313 A | * | 9/1998 | Armstrong | 248/346.2 |
| 6,073,902 A | * | 6/2000 | Hiles | 248/346.2 |
| 6,129,321 A | * | 10/2000 | Minelli et al. | 248/183.1 |

* cited by examiner

Primary Examiner—Leslie A. Braun
Assistant Examiner—A. Joseph Wujciak, III
(74) Attorney, Agent, or Firm—Devon A. Rolf

(57) ABSTRACT

An apparatus for removably mounting an electronic device on a surface, the surface having a contour. The apparatus comprises a receiving member adapted to be coupled with the electronic device, and a base. The base includes both an upper portion and a lower portion. The upper portion of the base is adapted to be coupled with the receiving member and the lower portion of the base is adapted to be coupled with the mounting surface. The base includes a malleable portion which is adapted to conform to the contour of the surface.

7 Claims, 3 Drawing Sheets

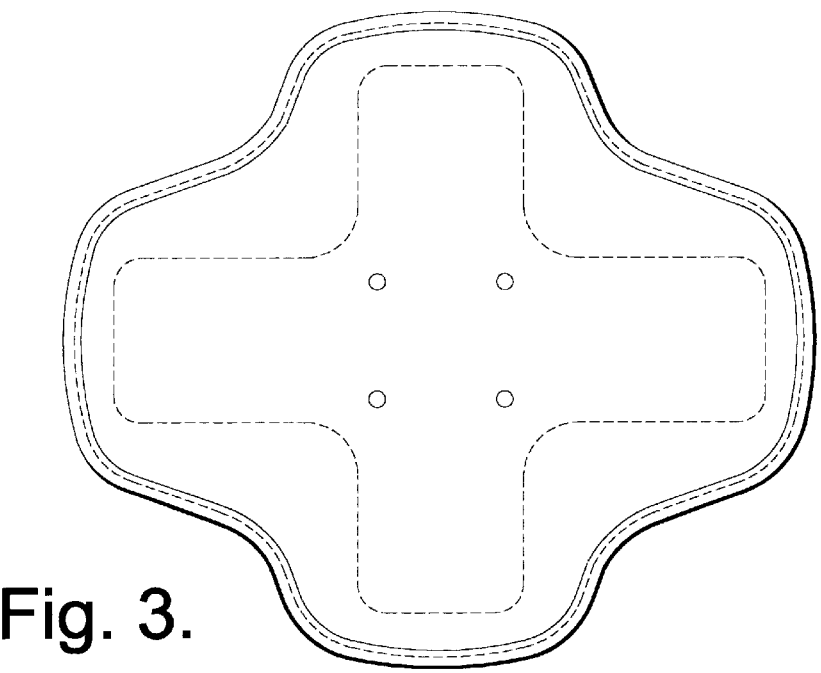
Fig. 3.
Fig. 4.
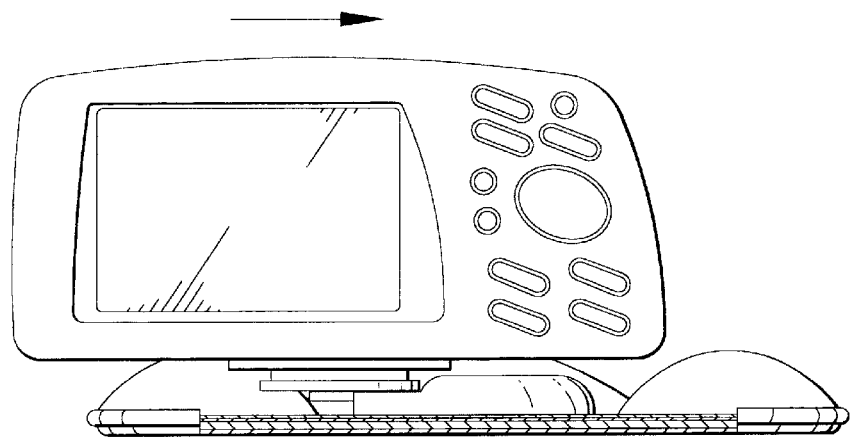
Fig. 6.

MOUNTING APPARATUS FOR AN ELECTRONIC DEVICE

STATEMENT REGARDING FEDERALLY SPONSORED RESEARCH OR DEVELOPMENT

Not Applicable.

CROSS-REFERENCE TO RELATED APPLICATIONS

Not Applicable.

FIELD OF THE INVENTION

This invention relates to a mounting apparatus for an electronic device. More particularly, this invention relates to a mounting apparatus for an electronic device which can be conformed to the contour of a support surface to provide for increased surface area contact between the apparatus and the surface, thus increasing the ability of the apparatus to grip the surface.

BACKGROUND OF THE INVENTION

The use of electronic devices in vehicles has increased in recent years. For example, it is increasingly more common to see electronic devices such as global positioning satellite devices, portable telephones, radios and personal digital assistants (PDAs) mounted within vehicles either permanently or in a manner such that the device may be portable. Many of these devices have a screen which visibly communicates information to the user thereof. Thus, it is advantageous to be able to adjust the angle of the device to provide maximum viewing capability to the user. The portable device further is advantageous in that it can be taken from the vehicle and used outside of the vehicle, thus adding value to the device.

Due to the wide variety of electronic devices that can be mounted within a vehicle, there are many different types of mounting apparatuses that can secure an electronic device to the dashboard, floor, or other support surface in a vehicle such that a user may view and access the device. Prior art mounting apparatuses typically are secured to the dashboard or floor through the use of screws, bolts, clips, rivets, VELCRO®, putty or other types of fasteners or adhesives known in the art.

The mounting of devices within vehicles presents a number of disadvantages. For example, it is difficult to mount an electronic device in a vehicle without causing damage to the surface to which it is mounted, e.g., the dashboard or floor. In a number of instances, one or more fasteners are secured through drilling into the surface of the dashboard, or through the floor, to secure the mounting apparatus. When the fasteners are disconnected and the mounting apparatus is removed from its original location, one or more holes remain in the support surface.

In addition, it is difficult to re-mount the electronic device at a different location in the vehicle. In order to change the location of the electronic device within the vehicle, the mounting apparatus must first be removed from its original location. This requires a variety of tools to remove the screws or adhesives that were used to secure the mounting apparatus in its original location. Second, once removed from its original location, the mounting apparatus must be secured in the new location, again through the use of screws, adhesive material, or the like. The removal, placement and re-fastening of the device can be a time consuming process and thus the feasibility of convenient, frequent location changes is diminished.

Accordingly, there remains a need for a mounting apparatus that can be easily mounted within a vehicle with little damage to the mounting surface. In addition, there remains a need for an apparatus for mounting an electronic device in a vehicle, the location of which may be quickly and easily changed as desired.

SUMMARY OF INVENTION

Accordingly, in one of its aspects, the present invention provides an apparatus for mounting an electronic device on a surface that causes little to no damage to the surface.

In another of its aspects, the present invention provides an apparatus for mounting an electronic device on a surface which may be moved with minimal effort or inconvenience.

In yet another of its aspects, the present invention provides a mounting apparatus that conforms to a contour of the surface on which it is mounted.

According to the present invention, the foregoing and other objects are achieved by an apparatus for removably mounting an electronic device on a surface, the surface having a contour. The apparatus comprises a receiving member adapted to be coupled with the electronic device, and a base. The base includes both an upper portion and a lower portion. The upper portion of the base is adapted to be coupled with the receiving member and the lower portion of the base is adapted to be coupled with the mounting surface. The base includes a malleable portion which is adapted to conform to the contour of the surface.

Aspects of the present invention are further achieved by an apparatus for removably mounting a global positioning satellite device to a vehicle surface, the apparatus adapted to conform to a contour of the surface and to adequately support the device. The apparatus includes a receiving means adapted to selectively receive the global positioning satellite device and a base. The base is adapted to be coupled with the receiving means and includes a conforming means adapted to conform the base to the contour of the surface.

Additionally, aspects of the invention are achieved by a holding device for removably mounting a hand-held electronic instrument to a support surface. The holding device includes a conforming base member adapted to be coupled with the support surface and conform to a contour of the surface. The holding device further includes a receiving member having an upper face and a lower face. The upper face is adapted to be coupled with the electronic instrument and the lower face is adapted to be coupled with the base member.

Further aspects of the present invention are achieved by a method of mounting an electronic device to a support surface. The method includes mounting a base to the support surface, the base having a lower portion adapted to be coupled with the support surface and an upper portion adapted to be coupled with the electronic device. The base further includes a conforming portion adapted to conform to a contour of the support surface. The method further includes conforming the lower portion of the base to the contour of the surface and coupling the electronic device with the base.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means and instrumentalities and combinations particularly pointed out in the appended claims.

BRIEF DESCRIPTION OF THE DRAWINGS

In the accompanying drawings which form a part of the specification and are to be read in conjunction therewith and in which like reference numerals are employed to indicate like parts in the various views:

FIG. 3 is a bottom view of the base of an electronic device mounting apparatus in accordance with the present invention, the structural portion of which is shown in hidden lines;

FIG. 4 is a right side elevational view of a mounting apparatus in accordance with the present invention;

FIG. 6 is a front elevational view of an electronic device mounted on an apparatus of the present invention, the apparatus shown in cross section with the view taken generally along line 6—6 of FIG. 2.

DETAILED DESCRIPTION OF THE PREFERRED EMBODIMENT

The present invention is directed toward a malleable mounting apparatus which shapes to the contour of a surface on which it is placed and provides adequate support for an electronic device mounted thereon. The particular embodiments described herein are intended in all respects to be illustrative rather than restrictive. Alternative embodiments will become apparent to those skilled in the art to which the invention pertains without departing from its scope.

Figure 1:
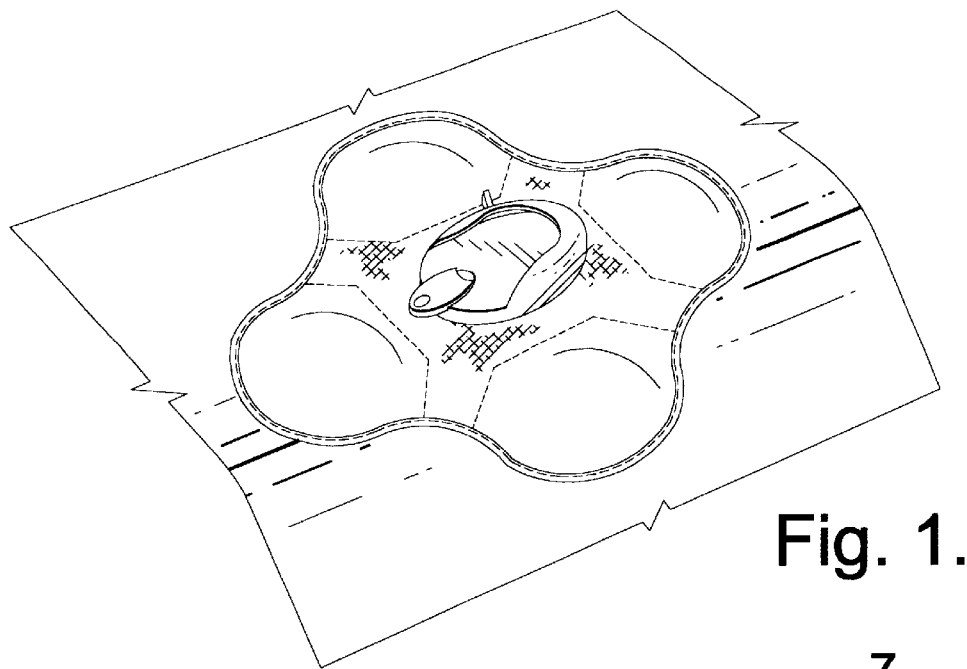
FIG. 1 is a front perspective view of a base and receiving member for an electronic device that is contoured to a surface in accordance with a preferred embodiment of the present invention.
Figure 5:
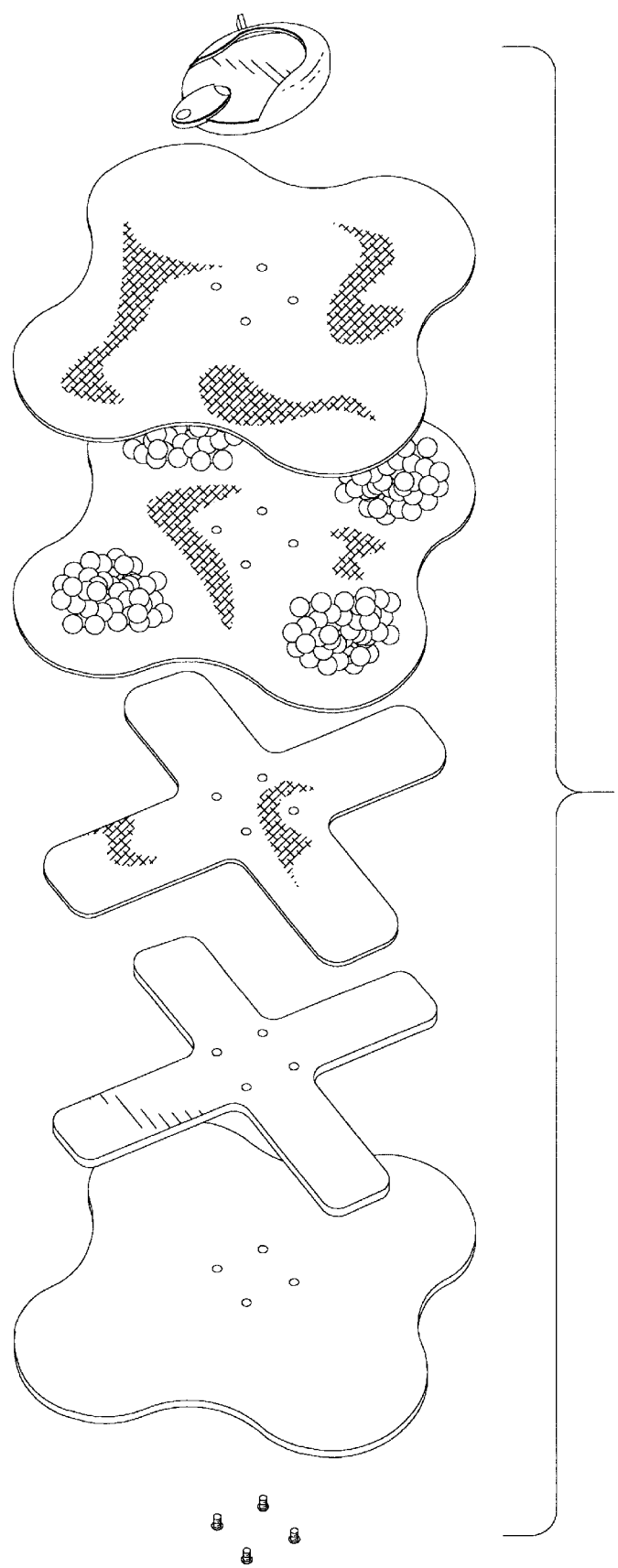
FIG. 5 is an exploded view of the present invention illustrating the various components of the mounting apparatus of the present invention.

Referring to the drawings in detail, and initially to FIGS. 1 and 5 in particular, an exemplary mounting apparatus employing the principles of the present invention is shown and designated generally by reference numeral 10. In its most basic configuration, apparatus 10 includes a base 12 and a receiving member 14, the base being capable of shaping to the contour of a surface 16, as more fully described below. Receiving member 14 may be removably or fixedly mounted to base 12 by any number of means known in the art so long as receiving member 14 is adequately supported on base 12 when an electronic device 18 is mounted in receiving member 14. All such variations are contemplated to be within the scope of the present invention.

As best seen in FIG. 6, electronic device 18 typically includes a display 20 and buttons, knobs or other function keys 21 thereon. Electronic device 18 also typically includes a pedestal 22 that is adapted to be removably mounted on receiving member 14. It will be understood and appreciated that the principles of the present invention equally apply to various types of electronic devices including, but not limited to, global positioning systems (GPS), radios, televisions, PDAs, telephones, compact disc and cassette players, radar detectors and the like. The mounting of all such varieties of electronic devices is contemplated to be within the scope hereof.

Figure 7:
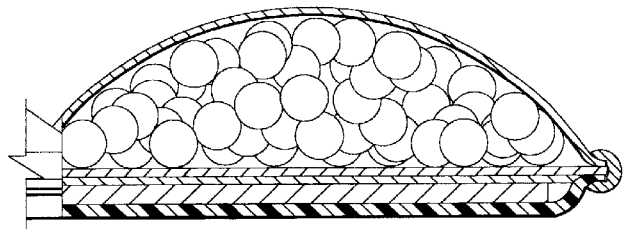
FIG. 7 is a cross-sectional view taken generally along line 7—7 of FIG. 2 showing the filler material contained within the pocket of the base as well as the various components of the base of the mounting apparatus of the present invention.

As best seen in FIGS. 4, 5 and 7, base 12 is a multi-layered structure that includes a lower portion 24, a structural portion 26, a cover portion 28, a malleable portion 30, filler material 32 and an upper portion 34. Generally, lower portion 24 and upper portion 34 form a shell that encloses structural portion 26, cover portion 28, malleable portion 30 and filler material 32. A plurality of fastening members 36 extend through base 12 and securely mount receiving member 14 to upper portion 30. It will be understood and appreciated that a single fastener may be adequate and such variation is contemplated to be within the scope of the present invention.

As best seen in FIGS. 4, 5 and 7, lower portion 24 forms a part of the shell and is adapted to interact with surface 16. Lower portion 24 is preferably formed, at least in part, of a material which provides friction between the lower portion and the mounting surface, e.g., rubber. Lower portion 24 thus aids in reducing the slippage between base 12 and surface 16. It should be understood that lower portion 24 may be formed of plastic, polymeric material, metal, wood or any other material that increases friction and/or minimizes slippage between base 12 and surface 16.

Lower portion 24 is adapted to be placed on a support surface within a vehicle, such as the dashboard or floor. Lower portion 24 includes a plurality of protrusions 38 that extend therefrom. In the preferred embodiment, the lower portion includes four protrusions which extend from the center thereof to form an X-shape as shown in FIG. 5. It will be understood and appreciated, however, that lower portion 24 may have any number of protrusions extending therefrom as long as the lower portion, including the protrusions, is of a size and shape that provides adequate support for electronic device 18.

To fasten lower portion 24 to the remaining components of base 12, apertures 40 are formed in the central portion thereof, each aperture being adapted to accept a fastening member 36. It is within the scope of this invention to include as many apertures as are deemed necessary to secure all of the components of base 12 to one another. In the preferred embodiment, the number of apertures is equal to the number of fastening members 36 that are used to couple base 12 with receiving member 14. In addition, it will be understood and appreciated that a plurality of apertures is also formed in structural portion 26, cover portion 28, malleable portion 30 and upper portion 34, as more fully described below. Preferably, the number of apertures in each of these components of base 12 is equal to the number of apertures in lower portion 24.

As best seen in FIGS. 5 and 7, structural portion 26 is secured between lower portion 24 and cover portion 28. Structural portion 26 is preferably formed of a malleable material that is capable of bending upon the application of sufficient pressure and of retaining the bent shape until pressure is again applied. Structural portion 26, thus aids in conforming base 12 to the contour of surface 16. When apparatus 10 is moved to a different location within the vehicle, or to a different vehicle or alternative support surface, structural portion 26 can be reshaped to conform to the contour of the new surface upon the application of moderate pressure.

Alternatively, structural portion 26 may be formed of a rigid material that is substantially incapable of bending upon the application of moderate pressure. In this embodiment, base 12 would be conformed to the contour of surface 16 through the use and placement of filler material 32, as more fully described below. Both embodiments are contemplated to be within the scope of the present invention.

Structural portion 26 includes a number of protrusions 42 extending therefrom. Similar to lower portion 24, in the preferred embodiment, the structural portion includes four protrusions which extend from the center thereof to form an X-shape as shown in FIG. 5. It will be understood and appreciated, however, that structural portion 26 may have any number of protrusions extending therefrom as long as the structural portion, including the protrusions, is of a size and shape that provides adequate support for electronic device 18. As best seen in FIG. 3, the distance from the end of one protrusion 42 to the end of the opposite flange is preferably equal to or less than the distance between corresponding protrusions 38 on lower portion 24. In other words, structural portion 26 is adapted to be positioned on top of lower portion 24 such that protrusions 42 do not extend beyond the ends of protrusions 38.

With reference to FIG. 5, apertures 44 are formed in the central portion of structural portion 26 and are adapted to accept fastening members 36. Apertures 44 are placed to align with apertures 40 in lower portion 24. As such, when fastening members 36 are inserted as more fully described below, structural portion 26 and lower portion 24 are coupled with one another.

As best seen in FIGS. 5 and 7, cover portion 28 includes a number of protrusions therefrom similar to lower portion 24 and structural portion 26. In the preferred embodiment, there are four protrusions extending from the center portion of cover portion 28 forming an X-shape. Cover portion 28 is substantially the same size as structural portion 26, but it is within the scope of this invention for cover portion 28 to take other shapes and sizes. Cover portion 28 is adapted to align with and lay on the top surface of protrusions 42. Cover portion 28 is preferably formed of a flexible material including, but not limited to plastic, vinyl, leather, cotton, rayon, polyester and the like. A set of apertures 46 are formed in the center portion of cover portion 28 which are adapted to receive fastening members 36. Apertures 46 preferably align with apertures 40 and 44 such that when fastening members 36 are inserted as more fully described below, cover portion 28 is aligned with and coupled with lower portion 24 and structural portion 26.

Malleable portion 30 is adapted to be positioned on top of cover portion 28. As best seen in FIG. 5, malleable portion 30 includes a number of protrusions 48 extending therefrom. Similar to lower portion 24, in the preferred embodiment, the malleable portion includes four protrusions which extend from the center thereof to form an X-shape as shown in FIG. 5. It will be understood and appreciated, however, that malleable portion 30 may have any number of protrusions extending therefrom as long as the malleable portion, including the protrusions, is of a size and shape that permits it to align with lower portion 24 and upper portion 34 such that the peripheral edges of the upper and lower portions may be aligned with one another.

Malleable portion 30 is preferably formed of a flexible material such as, but not limited to plastic, vinyl, leather, cotton, rayon, polyester and the like. Specifically, the material used to form malleable portion 30 is adapted to prevent the passage of filler material 32 downwardly through malleable portion 30 and into contact with cover portion 28, structural portion 26 and lower portion 24. Filler material 32 is contained in the shell formed by upper portion 30 and malleable portion 30 which will be more fully described below. Further, apertures 50 are formed in the center portion of malleable portion 30 and are adapted to align with apertures 40, 44, 46 and receive fastening members 36.

Figure 2:
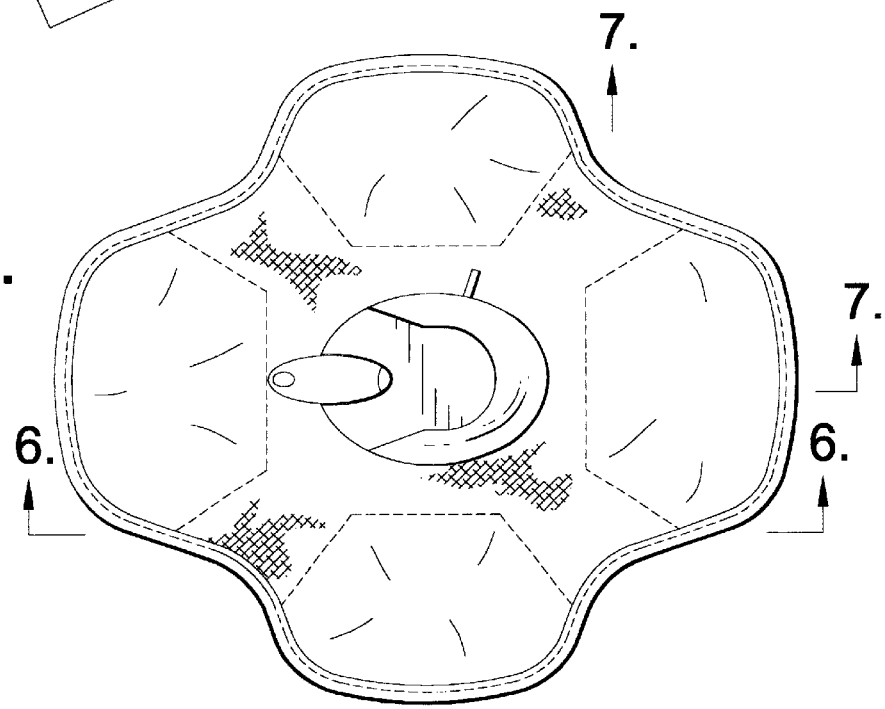
FIG. 2 is a plan view of the base and the receiving member of the apparatus of the present invention.

As best seen in FIG. 7, upper portion 34 is coupled with lower portion 24 to form the shell. As seen in FIGS. 2 and 5, upper portion 34 includes a number of protrusions 52 extending therefrom. Similar to lower portion 24, in the preferred embodiment, the upper portion includes four protrusions which extend from the center thereof to form an X-shape as shown in FIG. 5. It will be understood and appreciated, however, that upper portion 34 may have any number of protrusions extending therefrom as long as the upper portion, including the protrusions, is of a size and shape to align with lower portion 24. In the preferred embodiment, the number of protrusions on upper portion 34 is the same as the number of protrusions on lower portion 24 and malleable portion 30 so the peripheral edges of each portion are capable of being aligned with one another.

Upper portion 34 is preferably formed of a flexible material such as, but not limited to plastic, vinyl, leather, cotton, rayon, polyester and the like. Specifically, as best seen in FIG. 7, the material that is used to form upper portion 34 is adapted to enclose filler material 32 between malleable portion 30 and upper portion 34 and prevent the passage of that filler material 32 outwardly into the external environment. Further, apertures 54 are formed in the center portion of upper portion 34 and align with apertures 40, 44, 46, 50 and are adapted to accept fastening members 36.

Filler material 32 is used to weigh down base 12 so that the bottom surface of lower portion 24 makes adequate contact with surface 16. As best seen in FIGS. 4, 5 and 7, filler material 32 is preferably adapted to be placed in pockets 56 that are formed in the interior shell to allow for equal distribution of the weight to protrusions 38. The construction of pockets 56 will be more fully described below. In the alternative, filler material 32 may be placed throughout the interior shell formed between malleable portion 30 and upper portion 34 thereby eliminating the need for pockets 56. Filler material 32 is made up of a plurality of pellets that are preferably formed of plastic, metal or granular material such as, but not limited to, sand, rice, beans and the like. Filler material 32 can also be in the form of a fluid such as, but not limited to water, gel and the like. If filler material 32 is in fluid form, malleable portion 30 and upper portion 34 should be formed of a material that seals the liquid in pockets 56 to prevent the escape of liquid from the interior shell. The amount of filler material 32 may be varied as appropriate, but the amount of filler should be enough to sufficiently weigh down and prevent base from sliding along surface.

Fastening members 36 are used to align all of the components of base 12 and to couple receiving member 14 to base 12. Fastening members 36 are preferably in the form of screws, bolts, clips, rivets or the like. Fastening members 36 are adapted to extend upwardly through the apertures 40, 44, 46, 50, 54 and secure receiving member 14 to base 12. Alternatively, it is within the scope of the present invention to use adhesive, VELCRO®, putty or the like to fasten receiving member 14 to base 12. As best seen in FIGS. 2 and 7, a seam 58 is used to enclose the interior and shell of base 12. Specifically, seam 58 is adapted to extend along the peripheral edge of upper portion 34 and lower portion 24 and fasten portions 24, 34 to seal the shell. In addition, seam 58 is adapted to extend along the peripheral edge of upper portion 34 and malleable portion 30 and fasten portions 30, 34 to seal the interior shell.

Receiving member 14 is used to removably couple electronic device 18 to base 12. Receiving member 14 is described in U.S. Pat. No. 6,129,321 to Minelli et al. issued Oct. 10, 2000. U.S. Pat. No. 6,129,321 is hereby incorporated by reference in its entirety. The receiving member described in the Minelli patent is useful for accepting an electronic device, but is not capable of being removably mounted to a surface. Referring back to the present invention and to FIGS. 1, 2 and 5, base 12 allows receiving member 14 to be removably secured to surface 16. Receiving member 14 generally includes a support 60, a receiving slot 62, a locking arm 64 and a handle 66. Support 60 includes a lower face that is adapted to couple with upper portion 34 and an upper face in which receiving slot 62 is formed therein for accepting electronic device 18.

As best seen in FIGS. 2 and 6, receiving slot 62 extends from the upper surface of support 60 and includes an open end adapted to accept pedestal 22 on electronic device 18. Locking arm 64 is a retaining mechanism that is generally positioned at the end of support 60 and is in line with the open end of receiving slot 62. Locking arm 64 further includes a ratchet and pawl mechanism, not shown, that is adapted to releasably hold electronic device 18 within the receiving slot 62. Handle 66 is coupled to the pawl and ratchet mechanism and allows for the selective removal of electronic device 18 from receiving slot 62. Specifically, handle 66 is moved between an engaged position so that electronic device 18 is retained in receiving slot 62 and a disengaged position to allow for the removal electronic device 18. It should be understood that receiving slot 14 could take various forms as long as receiving member 14 is adapted to selectively engage an electronic device and is adapted to be coupled to base 12.

In assembling apparatus 10 as shown in FIGS. 5 and 7, structural portion 26 is placed on top of lower portion 24 so that apertures 40, 44 are aligned. Structural portion 26 is positioned so that flanges 42 are placed on top of protrusions 38 and preferably no part of flanges 42 extend over the peripheral edge of lower portion 24. Cover portion 28 is placed over flanges 42 on structural portion 26 so that apertures 44, 46 are aligned. Malleable portion 30 is placed on top of cover portion 28 to align the peripheral edges of upper and lower portions 34, 24. In addition, apertures 50 are aligned with apertures 40, 44, 46. Upper portion 34 is placed on top of malleable portion 30 so that the peripheral edges of portions 30, 34 are aligned. Fastening members 36 are inserted upwardly through apertures 40, 44, 46, 50, 54 to allow for the connection between base 12 and receiving member 14. The insertion of fastening members 36 also prevent lower portion 24, structural portion 26, cover portion 28, malleable portion 30 and upper portion 34 from shifting out of alignment during the assembly of apparatus 10.

As best seen in FIG. 7, upper portion 34 and malleable portion 30 are sewn together along line 68 to form pockets 56 within the interior shell. As best seen in FIGS. 2 and 7 pockets 56 are positioned generally on top of flanges 42. In particular, sewing line 68 starts from the peripheral edge of upper portion 34 and on one of the sides of protrusion 52. Sewing line 68 extends inwardly toward the center of upper portion 34 to a point approximately midway between the peripheral edge and the center of upper portion 34. From that point, line 68 extends generally parallel to the end of protrusion 52. Sewing line 68 extends toward the opposite side of the same protrusion 52 and away from the center of upper portion 34. Sewing line 68 is repeated for each protrusion 52 to form pockets 56.

Filler material 32 is placed within pockets 56 between malleable portion 30 and upper portion 34. As best seen in FIGS. 4 and 7, upper portion 34 is stretched over filler material 32 so that the peripheral edges of upper portion 34, malleable portion 30 and lower portion 24 are aligned. As best seen in FIGS. 2 and 7, seam 58 is wrapped around peripheral edge of lower portion 24 and upper portion 34. Seam 58 is sewn along line 70 to couple lower portion 24, cover portion 28, malleable portion 30 and upper portion 34. After seam is sewn along line 70, filler material 32 is enclosed within each of the pockets 56. Structural portion 26 is enclosed between lower portion 24 and cover portion 28 and is prevented from shifting or rotating within base 12. Receiving member 14 is placed on top of upper portion 34 and coupled to base 12 by fastening members 36

In operation, as best seen in FIGS. 1 and 7, lower portion 24 of base 12 is placed on a surface 16. Flanges 42 on structural portion 26 are bent to conform to the contour and shape of surface 16. The bending of structural portion 26 maximizes the contact between the lower portion 24 and surface 16 to reduce the amount of slipping that takes place between base 12 and surface 16. The weight of filler material 32 acts downwardly on flanges 42 to resist the movement of structural portion 26 once structural portion 26 is shaped to the contour of surface 16. The weight of filler material 32 also acts downwardly on protrusions 38 to establish a firm connection between lower portion 24 and surface 16 and reduce the amount of slipping between lower portion 24 and surface 16. As best seen in FIGS. 1 and 6, after base 12 has been contoured to surface 16, pedestal 22 is slid into receiving member 14 and retained by receiving slot 62. Locking arm 64 secures pedestal 22 within receiving slot 62 and prevent electronic device 18 from sliding out of receiving slot 62. The positioning of the electronic device 18 can then be adjusted so a user can easily view display 20 and access buttons and knobs 21. Handle 66 can be used to selectively release electronic device 18 from receiving member 14.

Apparatus 10 can be moved to a different location without causing damage to surface 16. Apparatus 10 is lifted from surface 16, moved to a different location and placed on the surface in the new location. Once base 12 makes contact with the new surface, structural portion 26 is bent and shaped to the contour of the surface so that lower portion 24 is in contact with the surface. Filler material 32 weighs down structural portion 26 to hold sheet 36 in its contoured shape and to prevent slipping between lower portion 24 and the new surface. Electronic device 18 can remain coupled to receiving member 14 when apparatus is moved to a different location or electronic device 18 can be removed prior to moving apparatus 10 and re-coupled to receiving member after the apparatus 10 has been moved to the new location.

In an alternative embodiment, pockets 56 may be positioned between flanges 42 instead of being positioned directly on top of flanges 42. Pockets 56 are formed in the same manner as described in the preferred embodiment and filler material 32 would be inserted within pockets 56 between malleable portion 30 and upper portion 34. Seam 58 is sewn along line 70 to couple lower portion 24, cover portion 28, malleable portion 30 and upper portion 34 and enclose filler material 32 within pockets 56. In this embodiment, structural portion 26 could be formed of either a malleable or rigid material.

In operation of the alternative embodiment, lower portion 24 of base 12 is placed on a surface 16. If formed of a malleable material, flanges 42 on structural portion 26 are bent to conform to the contour and shape of surface 16. Flanges 42 place a downward force on lower portion 24 and place lower portion 24 into contact with surface 16. In addition, filler material 32 located within pockets 56 applies a downward force on lower portion 24 between each of the flanges 42. Therefore, flanges 42 and filler material 32 operate to place lower portion 24 into contact with surface 16 in the locations directly below flanges 42 and therebetween to increase the amount of contact between lower portion 24 and surface 16. If a rigid structural portion 26 is used, flanges 42 would generally not be bent to conform to surface 16, instead, filler material 32 would conform lower portion 24 to surface. Filler material 32 would weigh down lower portion 24 in the locations between each of flanges 42 to conform lower portion 24 to surface 16. Just as in the preferred embodiment, electronic device 18 can be secured to receiving member 14 and adjusted according to the preferences of a user.

In still another embodiment, it is not necessary to form pockets 56 between malleable portion 30 and upper portion 34. Filler material 32 can be placed throughout the interior shell formed between malleable portion 30 and upper portion 34. Structural portion 26 may be formed of a malleable or rigid material. When structural portion 26 remains rigid or is bent to conform to surface 16, filler material 32 between malleable portion 30 and upper portion 34 has a natural tendency to collect between flanges 42. When filler material 32 collects between flanges 42, the weight of filler material 32 operates to apply a downward force on lower portion 24 in these locations between each of the flanges 42. The lower portion 24 in these locations is placed into contact with surface 16 and prevents base 12 from sliding along surface 16. Just as in the previous two embodiments, electronic device 18 can be secured to receiving member 14 and adjusted according to the preferences of a user.

Constructed and operated as previously described, the invention provides a mounting apparatus that contours to a surface and supports an electronic device. In addition, this invention provides an apparatus that allows for easy mounting of an electronic device within a vehicle. Further, this invention provides an apparatus that allows for mounting of an electronic device to a surface without damaging the vehicle.

In summary, the present invention is directed to an apparatus for mounting an electronic device on a surface. The present invention has been described in relation to particular embodiment which are intended in all respects to be illustrative rather that restrictive. Alternative embodiments will become apparent to those skilled in the art to which the present invention pertains without departing from its scope.

From the foregoing, it will be seen that this invention is one well-adapted to attain the ends and objects hereinabove set forth together with other advantages which are obvious and inherent to the device. It will be understood that certain features and subcombinations are of utility and may be employed without reference to other features and subcombinations. This is contemplated by and within the scope of the claims.

Having thus described the invention, what is claimed is:

1. An apparatus for removably mounting an electronic device on a surface, wherein said surface has a contour, said apparatus comprising:

a receiving member adapted to be coupled with the electronic device;

a base, said base having a lower portion adapted to be coupled with the surface and an upper portion adapted to be coupled with said receiving member, wherein said base includes a malleable portion located between said upper and lower portions of said base, said member adapted to conform to the contour of the surface;

a structural portion located between said malleable portion and said lower portion of said base, wherein said structural portion provides support to said base; and a cover portion located between said malleable portion and said structural portion.

2. An apparatus for removably mounting an electronic device on a surface, wherein said surface has a contour, said apparatus comprising:

a receiving member adapted to be coupled with the electronic device said receiving member including
  a support, said support having an upper face and a lower face, wherein said lower face is adapted to be coupled with said upper surface of said base and wherein said upper face is adapted to be coupled with the electronic device,
  a receiving slot formed on said upper face of said support, said slot adapted to receive the electronic device,
  a locking arm, said locking arm adapted to retain the electronic device in said receiving slot, and
  a release mechanism for selectively actuating said locking arm; and
a base, said base having a lower portion adapted to be coupled with the surface and an upper portion adapted to be coupled with said receiving member, wherein said base includes a malleable portion, said member adapted to conform to the contour of the surface.

3. An apparatus for removably mounting a global positioning satellite device to a vehicle surface, said apparatus adapted to conform to a contour of said surface and to adequately support said device, said apparatus comprising:
  receiving means adapted to selectively receive the global positioning satellite device;
  a base including an upper portion and a lower portion, said upper portion adapted to be coupled with said receiving means and said lower portion adapted to engage the surface on which the device is to be mounted, and wherein said base includes a conforming means is located between said upper and lower portions of said base and adapted to conform said base to the contour of the surface;
  a structural portion located between said conforming means and said lower portion of said base; and
  a cover portion located between said conforming means and said intermediate portion.

4. An apparatus for removably mounting an electronic device on a surface, said apparatus comprising:
  a receiving member adapted to be coupled with the electronic device, wherein said receiving member includes
    a receiving slot operable to removably receive at least a portion of the electronic device, and
    a releasable locking mechanism operable to releasably retain the at least a portion of the electronic device within the receiving slot; and
  a base, said base having a lower portion adapted for resting on and conforming to said surface and an upper portion adapted for coupling with said receiving member, said base including one or more pockets containing a filler material operable to anchor the base to the surface.

5. The apparatus as set forth in claim 4, wherein there are at least three pockets evenly spaced about a perimeter of the base.

6. The apparatus as set forth in claim 4, wherein there are at least three pockets evenly spaced about a perimeter of the base and protruding radially outward with respect to a center of the base.

7. An apparatus for removably mounting an electronic device on a surface, said apparatus comprising:
  a receiving member adapted to be coupled with the electronic device, wherein said receiving member includes
    a receiving slot operable to removably receive at least a portion of the electronic device, and
    a releasable locking mechanism operable to releasably retain the at least a portion of the electronic device within the receiving slot; and
  a base, said base having a lower portion adapted for resting on and conforming to said surface and an upper portion adapted for coupling with said receiving member, said base including at least three pockets evenly spaced about a perimeter of the base and protruding radially outward with respect to a center of the base and containing a filler material operable to anchor the base to the surface.

* * * * *

UNITED STATES PATENT AND TRADEMARK OFFICE
CERTIFICATE OF CORRECTION

PATENT NO.       : 6,439,530 B1
APPLICATION NO.  : 09/885421
DATED            : August 27, 2002
INVENTOR(S)      : Brian G. Schoenfish, Dale R. Langner and Jeffrey D. Minelli It is certified that error appears in the above-identified patent and that said Letters Patent is hereby corrected as shown below:

The title page should be deleted and substitute therefor the attached title page
FIG. 1 should be replaced with the following figure:

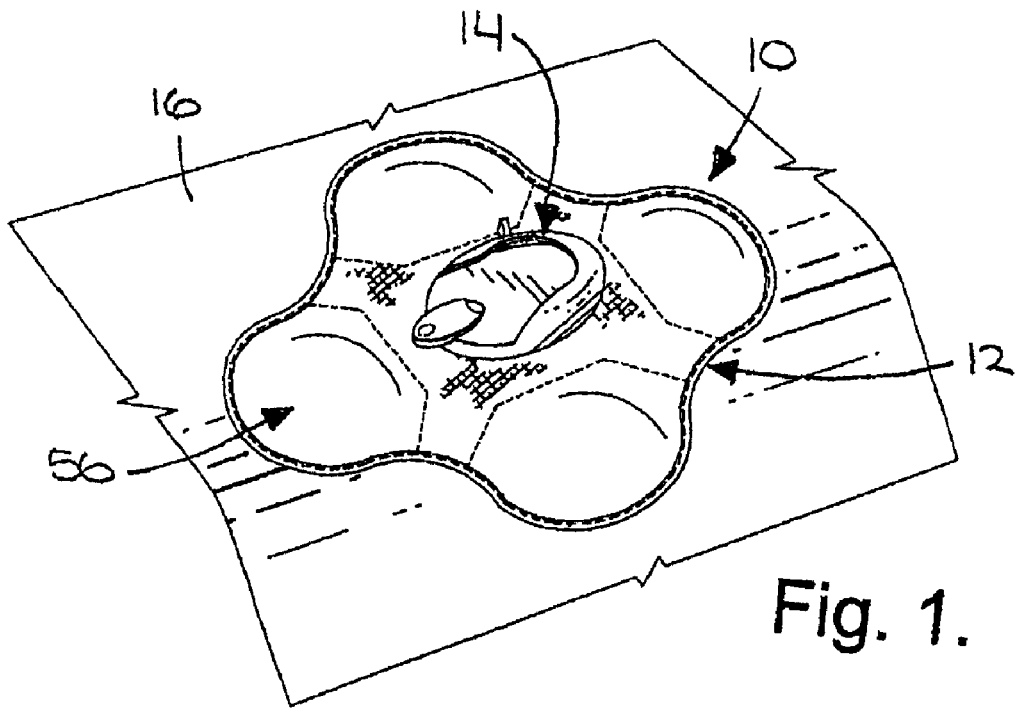

(12) United States Patent
Schoenfish et al.

(10) Patent No.: US 6,439,530 B1
(45) Date of Patent: Aug. 27, 2002

(54) MOUNTING APPARATUS FOR AN ELECTRONIC DEVICE

(75) Inventors: Brian G. Schoenfish, Kansas City; Dale R. Langner; Jeffrey D. Minelli, both of Olathe, all of KS (US)

(73) Assignee: Garmin Ltd. (KY)

(*) Notice: Subject to any disclaimer, the term of this patent is extended or adjusted under 35 U.S.C. 154(b) by 0 days.

(21) Appl. No.: 09/885,421

(22) Filed: Jun. 20, 2001

(51) Int. Cl.⁷ .................................. A47B 91/00
(52) U.S. Cl. ...................... 248/346.06; 248/346.2
(58) Field of Search ................ 248/346.06, 346.01, 248/346.2, 104, 310, 910

(56) References Cited

U.S. PATENT DOCUMENTS

| | | | |
|---|---|---|---|
| 2,219,974 A | * 10/1940 | Bellow | 220/69 |
| 2,806,131 A | * 9/1957 | Palmer | 240/1.2 |
| 2,916,184 A | * 12/1959 | Hartley et al. | 220/69 |
| 2,956,287 A | * 10/1960 | Stanford | 4/110 |
| 4,606,524 A | * 8/1986 | Cosee | 248/346 |
| 4,687,167 A | * 8/1987 | Skalka et al. | 248/282 |
| 4,788,916 A | * 12/1988 | Saxton | 108/43 |
| D312,650 S | * 12/1990 | Charrier | D16/242 |
| 5,193,220 A | * 3/1993 | Ichinohe et al. | 455/89 |
| 5,332,185 A | * 7/1994 | Walker, III | 248/346 |
| 5,350,147 A | * 9/1994 | Paganus | 248/346 |
| 5,735,632 A | * 4/1998 | Braverman | 404/6 |
| 5,742,256 A | * 4/1998 | Wakabayashi | 343/718 |
| 5,810,313 A | * 9/1998 | Armstrong | 248/346.2 |
| 6,073,902 A | * 6/2000 | Hiles | 248/346.2 |
| 6,129,321 A | * 10/2000 | Minelli et al. | 248/183.1 |

* cited by examiner

Primary Examiner—Leslie A. Braun
Assistant Examiner—A. Joseph Wujciak, III
(74) Attorney, Agent, or Firm—Devon A. Rolf

(57) ABSTRACT

An apparatus for removably mounting an electronic device on a surface, the surface having a contour. The apparatus comprises a receiving member adapted to be coupled with the electronic device, and a base. The base includes both an upper portion and a lower portion. The upper portion of the base is adapted to be coupled with the receiving member and the lower portion of the base is adapted to be coupled with the mounting surface. The base includes a malleable portion which is adapted to conform to the contour of the surface.

7 Claims, 3 Drawing Sheets

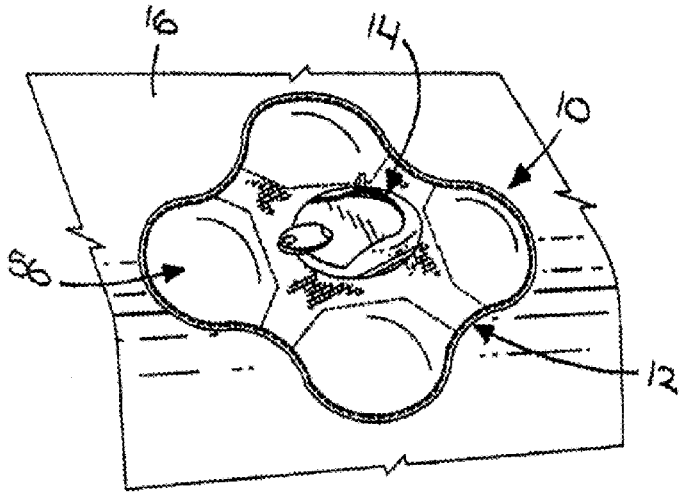

UNITED STATES PATENT AND TRADEMARK OFFICE
CERTIFICATE OF CORRECTION

PATENT NO.         : 6,439,530 B1                                               Page 3 of 7
APPLICATION NO. : 09/885421
DATED              : August 27, 2002
INVENTOR(S)       : Brian G. Schoenfish, Dale R. Langner and Jeffrey D. Minelli It is certified that error appears in the above-identified patent and that said Letters Patent is hereby corrected as shown below:

FIG. 2 should be replaced with the following figure:

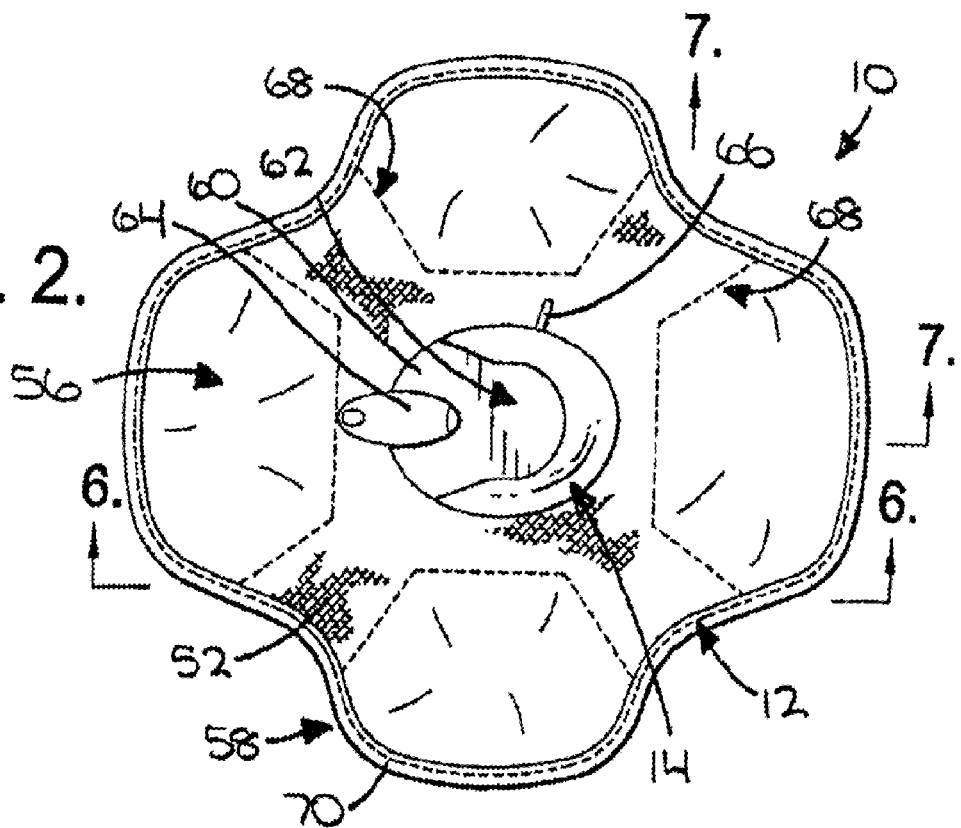

UNITED STATES PATENT AND TRADEMARK OFFICE
CERTIFICATE OF CORRECTION

PATENT NO.       : 6,439,530 B1                                          Page 4 of 7
APPLICATION NO.  : 09/885421
DATED            : August 27, 2002
INVENTOR(S)      : Brian G. Schoenfish, Dale R. Langner and Jeffrey D. Minelli It is certified that error appears in the above-identified patent and that said Letters Patent is hereby corrected as shown below:

FIGS. 3-4 should be replaced with the following figures:

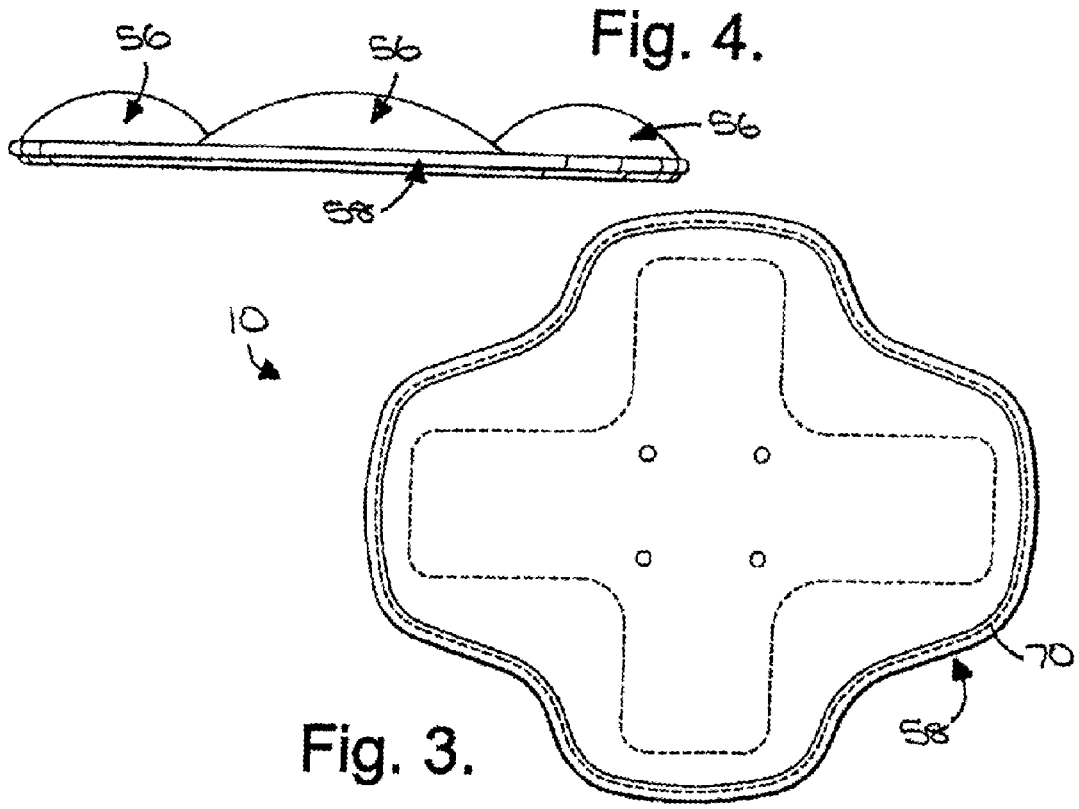

UNITED STATES PATENT AND TRADEMARK OFFICE
CERTIFICATE OF CORRECTION

PATENT NO.       : 6,439,530 B1
APPLICATION NO.  : 09/885421
DATED            : August 27, 2002
INVENTOR(S)      : Brian G. Schoenfish, Dale R. Langner and Jeffrey D. Minelli It is certified that error appears in the above-identified patent and that said Letters Patent is hereby corrected as shown below:

FIG. 5 should be replaced with the following figure:

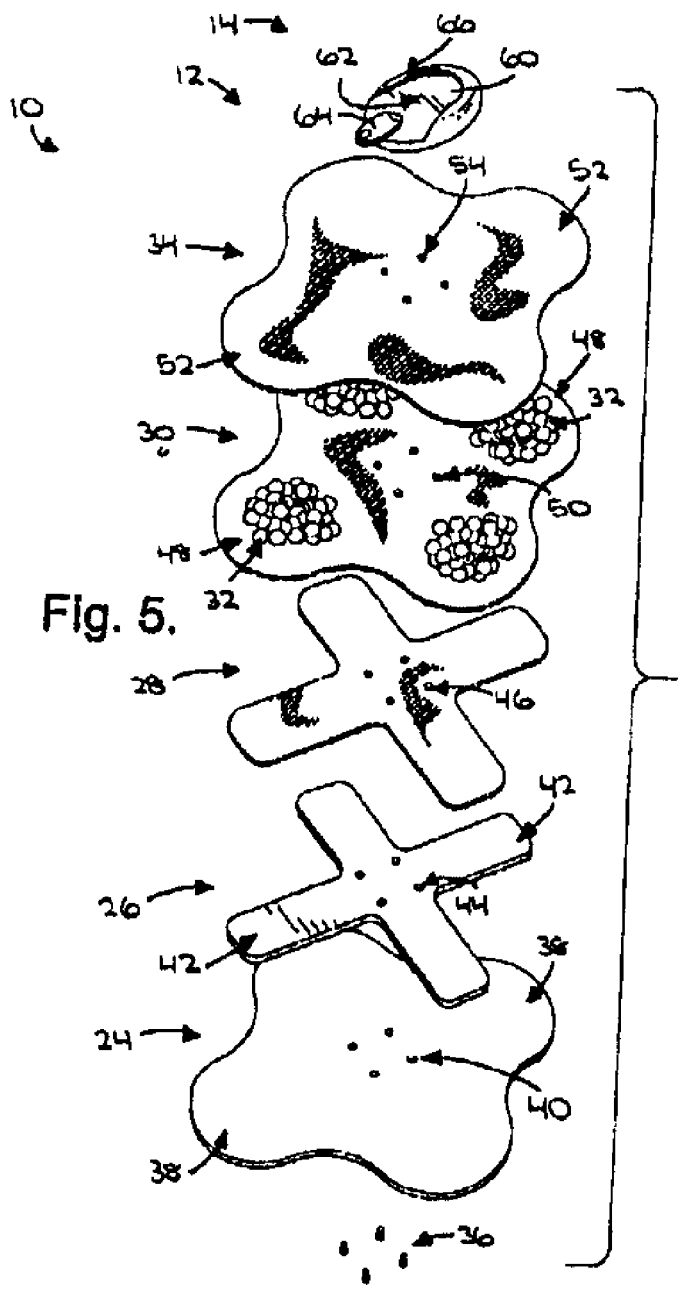

Fig. 5.

UNITED STATES PATENT AND TRADEMARK OFFICE
CERTIFICATE OF CORRECTION

| | | |
|---|---|---|
| PATENT NO. | : 6,439,530 B1 | Page 6 of 7 |
| APPLICATION NO. | : 09/885421 | |
| DATED | : August 27, 2002 | |
| INVENTOR(S) | : Brian G. Schoenfish, Dale R. Langner and Jeffrey D. Minelli | |

It is certified that error appears in the above-identified patent and that said Letters Patent is hereby corrected as shown below:

FIGS. 6-7 should be replaced with the following figures:

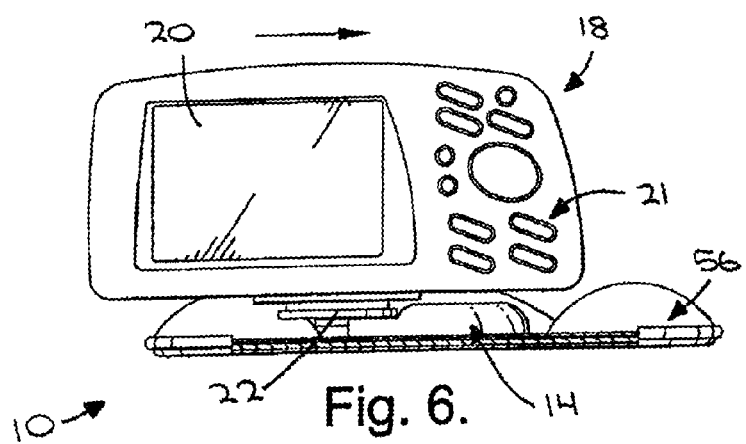
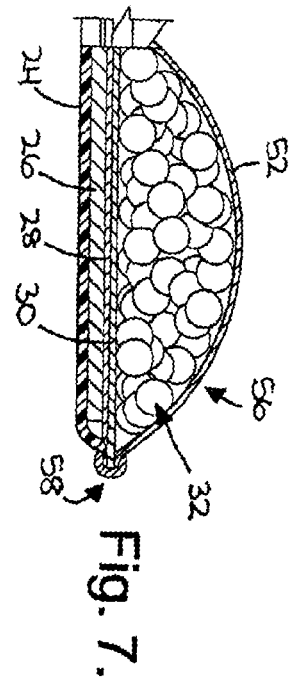

UNITED STATES PATENT AND TRADEMARK OFFICE
CERTIFICATE OF CORRECTION

PATENT NO. : 6,439,530 B1
APPLICATION NO. : 09/885421
DATED : August 27, 2002
INVENTOR(S) : Brian G. Schoenfish, Dale R. Langner and Jeffrey D. Minelli It is certified that error appears in the above-identified patent and that said Letters Patent is hereby corrected as shown below:

Claim 1, at column 10, line 58, "said member" should be deleted and replaced with --said malleable portion.--

Claim 2, at column 11, line 18, "said member" should be deleted and replaced with --said malleable portion."

Claim 3, at column 11, line 38, "said intermediate portion" should be deleted and replaced with --said structural portion.--

Signed and Sealed this

Fourth Day of March, 2008

JON W. DUDAS
*Director of the United States Patent and Trademark Office*